(12) United States Patent
Dwarshuis et al.

(10) Patent No.: US 9,346,946 B2
(45) Date of Patent: May 24, 2016

(54) COMPOSITE MATERIALS AND SHAPED ARTICLES

(75) Inventors: Pieter Jan Dwarshuis, Lelystad (NL); Ronald Edward Van Riemsdijk, Lelystad (NL)

(73) Assignee: HOLLAND COMPOSITES INNOVATION B.V., Lelystad (NL)

( * ) Notice: Subject to any disclaimer, the term of this patent is extended or adjusted under 35 U.S.C. 154(b) by 479 days.

(21) Appl. No.: 13/977,904

(22) PCT Filed: Dec. 16, 2011

(86) PCT No.: PCT/NL2011/050856
§ 371 (c)(1),
(2), (4) Date: Aug. 20, 2013

(87) PCT Pub. No.: WO2012/091558
PCT Pub. Date: Jul. 5, 2012

(65) Prior Publication Data
US 2013/0330993 A1 Dec. 12, 2013

(30) Foreign Application Priority Data
Dec. 31, 2010 (NL) ...................................... 2005945

(51) Int. Cl.
| B29B 17/02 | (2006.01) |
| B29C 70/08 | (2006.01) |
| C08K 13/04 | (2006.01) |
| B29B 17/00 | (2006.01) |
| B29C 67/04 | (2006.01) |
| E04C 2/10 | (2006.01) |
| E04C 2/24 | (2006.01) |
| B29K 75/00 | (2006.01) |
| B29K 105/04 | (2006.01) |

(52) U.S. Cl.
CPC ............. *C08K 13/04* (2013.01); *B29B 17/0005* (2013.01); *B29B 17/0042* (2013.01); *B29C 67/04* (2013.01); *B29C 70/08* (2013.01); *E04C 2/10* (2013.01); *E04C 2/246* (2013.01); *B29K 2075/00* (2013.01); *B29K 2105/04* (2013.01); *Y02W 30/62* (2015.05); *Y10T 428/249953* (2015.04); *Y10T 442/3919* (2015.04); *Y10T 442/674* (2015.04)

(58) Field of Classification Search
None
See application file for complete search history.

(56) References Cited

U.S. PATENT DOCUMENTS

| 5,916,932 A * | 6/1999 | Nosker ............... B29B 17/0042 238/84 |
| 6,044,604 A | 4/2000 | Clayton et al. ................ 52/309.9 |
| 2007/0066692 A1* | 3/2007 | De Juan Saiz ...... B29B 17/0042 521/40 |
| 2011/0094941 A1* | 4/2011 | Guschall ................. B03B 9/061 209/7 |

FOREIGN PATENT DOCUMENTS

| DE | 4018190 | 6/1990 | ............. B29C 67/16 |
| DE | 19755629 | 12/1997 | ................ B07B 9/02 |
| EP | 0 414 110 | 2/1991 | ............. C08K 13/04 |
| WO | WO 9222420 | 12/1992 | ............. B29C 67/14 |

OTHER PUBLICATIONS

Communication pursuant to Article 93(3) EPC dated Aug. 5, 2015, in EP 11813713.2.
International Search Report (ISR) and Written Opinion (WO) in PCT/NL2011/050856 dated Jun. 25, 2012.

* cited by examiner

*Primary Examiner* — Mary F Theisen
(74) *Attorney, Agent, or Firm* — Harness, Dickey & Pierce, P.L.C.

(57) ABSTRACT

A process for the preparation of a composite material from a particulate binder material having an average particle size (D9 0) of from 15 to 850 pm and a fibrous material having a density of from 150 to 550 kg/m3, comprising the steps of: a) blending the particulate binder material and the fibrous material, preferably in a weight ratio of 60:40 to 10:90, and b) subjecting the blended material obtained in a) to a curing step under increased temperature and pressure to obtain a composite material. The invention further relates to the composite material thus obtained, and to its use as building materials or as panelling.

24 Claims, No Drawings

COMPOSITE MATERIALS AND SHAPED ARTICLES

CROSS-REFERENCE TO RELATED APPLICATIONS

This application is a national phase application of PCT Application No. PCT/NL2011/050856, filed on Dec. 16, 2011, which claims the benefit and priority to Netherland Application No. NL 2005945, filed Dec. 31, 2010. The entire disclosures of the applications identified in this paragraph are incorporated herein by references.

The present invention relates to composite materials prepared from particulate binder materials and from fibrous filler material. The present invention further relates to a method for the preparation of the composites and shaped articles therefrom, and to their use as building materials, for furniture and for other structural and decorative applications.

BACKGROUND OF THE INVENTION

Composite materials, in particular shaped articles such as panels are used in various applications, for instance as outer claddings for buildings, as visual displays in advertising activities, and in structural applications. Such materials usually comprise a binder material and a solid filler material, typically a woven and/or non-woven fibre material that offers structural integrity and/or insulation value, as well as external layers facing the environment.

Specifically for outdoor applications, the composites have to be durably resistant to the different weathering conditions, including variations in humidity and temperature, exposure to UV and other radiation, and exposure to chemicals (micro) biological growth.

Composite materials for outdoor use have been developed based on fibre-enforced concrete material. However, these materials are difficult to shape or affix due to the low mechanical strength of the composites. Furthermore, the materials have a high density, which in combination with the low mechanical strength requires comparatively thick panels, which in turn makes them difficult to attach them for instance exterior building surfaces, limiting their use to applications and constructions that can bear the high weight. A further issue with these materials is the leaching of highly corrosive salts.

In order to reduce weight and/or to improve mechanical performance, composites based on plywood sheet materials and/or wood chips have been developed. Plywood usually consists of sheets of wood that are glued or cemented together, using for instance thermosetting polyurethane or thermosetting unsaturated polyester and styrene binders, or epoxy resin and amino curing agent binders.

To reduce the cost of composites, recycled materials are often used as at least part of the filler material. U.S. Pat. No. 6,044,604 for instance discloses a composite roofing board having a paper layer made of recycled paper fibers. U.S. Pat. No. 5,718,096 discloses using recycled materials and glass fibers in composite panel elements for use in building structures. U.S. Pat. No. 6,322,731 discloses the use of rice husks, wheat husks and sawdust in forming constructions panels.

However, while these materials show better mechanical properties as compared to fibre enforced concrete, they tend to emit organic compounds such as for example formaldehyde. For environmental reasons, there is a trend to use materials that emit low levels of organic volatiles.

Further, the process requires the handling of liquid binder materials that may emit volatile components even after the curing stage, while exposing the applier to toxic or irritant chemicals.

WO-A-2008/020768 discloses a process for manufacturing a composite board material from wood fibre does not, or only to a limited scale involve handling of toxic or irritant liquid materials. The process includes mixing together from 15% to 30% of waste powder coating powder, typically a polyester thermosetting resin, with sawdust having a particle size typically below 3 mm, there being from 40% to 75% of sawdust in the mix, and from 0.1% to 30% of a water based acrylic paint. Furthermore, the composite materials disclosed in WO-A-2008/020768 are inherently highly flammable, and hence not suitable as building materials without further modification, such as addition of fire retardants. Furthermore, the use of liquid paint alongside powdered particles will result in a cumbersome handling, and coalescing particles with inhomogeneous distribution of acrylic polymer, as well as causing issues due to encapsulated water that will gasify during the curing stage, leading to composite defects. Moreover, wood fibre, sawdust and/or acrylic paints will release volatile organic compounds, which will reduce the applicability of the obtained composite materials to areas where fogging out is not considered an issue. Yet a further disadvantage is the low hydrolytic stability of such composite products, since saw dust and woodchips are particularly vulnerable to moisture, potentially resulting in wood deterioration and rot.

In view of the foregoing, it should be apparent that there exists a need for a low-cost and highly stable composite building material that can be formed into building structural panels using a relatively simple and inexpensive manufacturing process, such that the panels have adequate dimensional stability, durability and flexibility.

Applicants have now surprisingly found that composite materials can be prepared from a particulate binder material and a fibrous material that is inherently fire retardant and resistant to humidity and/or rot. Furthermore, the materials can advantageously be sourced from recycling materials that otherwise has little other uses than fuel purposes.

Accordingly, the present invention relates to a process for the preparation of a composite material from a particulate binder material having an average particle size (D90) of from 15 to 850 µm and a fibrous material having a density of from 150 to 550 kg/m$^3$, comprising the steps of: a) blending the particulate binder material and the fibrous material, and b) subjecting the blended material obtained in a) to a curing step under increased temperature and pressure to obtain a composite material.

The present invention further provides a composite material that comprises primarily a fibrous filler material and a particulate binder material obtainable by the process. More particularly, the composite material preferably comprises recycled fibrous material and more preferably employs waste powder coating binder, optionally with additives and fillers. It is still another object of the present invention to provide a composite material that includes various amounts of other natural or synthetic recycled or virgin substances in proportions that will contribute to the structural integrity or other features of the material, such as preferably recycled ground hard polyurethane foam particles that will increase mechanical strength as well as improve the insulation properties.

Accordingly, there remains a need for composite materials that inherently have a higher fire retardancy and a higher resistance to water and/or deterioration.

The particulate binder material may be a thermoset or a thermoplastic binder material. The use of such materials allows to avoid toxic or environmentally harmful emissions of volatile compounds, as well as reduced exposure for the applicator to small molecules. Preferably, the particulate binder material comprises waste powder coating material obtained from overspray and/or powder coating production. Preferably, the binder is a thermoset binder; more preferably the binder comprises waste powder coating material.

While both thermoset or thermoplastic binders may be employed, preferably, the particulate binder material comprises a thermoset polymeric material due to the higher strength obtainable by these components.

Suitable particulate thermoplastic materials according to the present invention may advantageously comprise one or more functionalized polyolefins chosen among functionalized polyethylenes, functionalized polypropylenes, ethylene acid copolymers, ionomers, functionalized ethylene vinyl acetate (EVA) copolymers, functionalized ethylene alkyl (meth)acrylate copolymers, polyethylene terephthalate (PET), poly-ethylene-furanoate (PEF) and mixtures thereof. Preferably, the thermoplastic material comprises polypropylene, further preferably comprising one or more functionalized polyolefins, preferably ethylene copolymers and/or ionomers for improved adhesion. The thermoplastic binder polymer preferably has a melt flow index less than 500 g/10 min according to ASTM Method No. D1238 at 190° C. and a load of 2160 g. However, particularly suitable thermoplastic binders are recycled thermoplastics as disclosed in U.S. Pat. No. 6,191,228, however in particulate form suitable for the present process, including HDPE and PET and PEF, polyvinyl chloride (PVC), polypropylene (PP), polystyrene (PS), and mixtures thereof.

Suitable particulate thermoset binder materials according to the present invention are typically used for powder coating processes. The process for production of powder coatings compositions is well-known in the art and need not be described herein. Reference is e.g. made to the following books: Powder Coatings, T. A. Misev, Wiley, 1991 (particularly Chapter 5); Surface Coatings, S. Paul, Wiley, 1985 (particularly Chapter 8.4); Surface Coatings, vol. 2, OCCA, TAFE Educational Books, 1984 (particularly Chapter 42); and The Science of Powder Coatings, D. A. Bate, SITA Technology, London.

Most thermoset powders have a molecular weight lower than that of thermoplastic materials, yet higher than that of liquid coatings. Thermoset materials are typically solid resinous materials that, when heated, melt, flow, and—unlike thermoplastics—will then, or at the same time crosslink with one another, or other reactive substances present in the particles, so-called curing agents, to form compounds with higher molecular weights. The crosslinking reaction is usually known as curing step. After curing, a thermoset coating remains thermally stable, meaning it cannot be melted back into a liquid from further heating due to the high average molecular weights of the crosslinked polymers, and the three-dimensional network formed that usually results in gel formation.

In order to prepare such particulate thermoset powders, one or more thermoset resins are intimately mixed with suitable curing or crosslinking agents, to form a so-called master batch. The thus obtained reactive blends are cooled down immediately, and subsequently conveniently shaped into a very fine powder that can be applied as a thin powdery film on substrates to be coated. Alternatively, the resin and curing agents, optionally together with additives such as pigments, flow enhancers, UV stabilizers, catalysts and fillers are added and blended in suitable extruders prior to the shaping step. The shaping step usually involves milling. Suitable mills include ball mills.

The most commonly applied thermoset powder coating materials are derived from resins having epoxy, hydroxyl or carboxyl, acrylic, urethane and/or silicone functionality. These generally require lower curing temperatures than thermoplastics, and curing conditions are often tailored by additives to accelerate or delay the curing reaction. The powder coating material is usually applied through electrostatic deposition.

The powder-coated product are then thoroughly heated to a first temperature to allow the thermosetting resin to flow evenly over the targeted surface because once crosslinking is completed, the resin binder material cannot be returned into a liquid state to correct any flaws in the coating under normal conditions. Subsequently, the temperature is increased until the curing temperature is a reached. Accordingly, for successful coating results, it is necessary to employ an appropriate formulation with well-defined curing cycle, particularly with respect to melting and curing temperatures.

One of the most significant developments in thermoset powder coating involves the capacity to engineer resin types with variable properties designed to complement metal finishing treatments. This broader range of characteristics has led to an increase in specialized roles for thermoset powders, with polyesters and acrylics finding greater use in the automotive and appliance industries despite the traditional reliance on epoxy-based coatings. Most thermoset powders can provide a high level of corrosion, temperature, and impact resistance. They can also be designed with a wide range of colours, glosses, and surface finishes. Coating texture can be wrinkled, smooth, or matte, while film thickness is highly adjustable. Powder coatings can be effectively applied through electrostatic spraying Epoxy resin based thermoset resins are widely used in industrial powder coating, and they offer a wide range of formulation options. Different types of epoxy resins can be fabricated into functional thick film or more decorative thin film, while their crosslinking properties are similar to those of epoxy adhesives and paints. Most epoxy-based materials are crafted to be thermally stable at room temperature.

Epoxy resins are usually produced from bisphenol A and epichlorohydrin. Epoxy resin grades employed as powder coating resins typically have an epoxy content of about 1350 mmol/kg, a molecular weight of about 1500 and a viscosity of about 3.5 Pa.s at 150° C. and 0.7 Pa.s at 175° C. Typical curing (cross-linking) agents include polyamines.

A different thermoset powder advantageously employs epoxy resins but cured with or polycarboxylated polyester resins. A typical coating resin would for instance comprise 70 wt % of the above epoxy resin, and 30 wt % of a saturated carboxylated polyester resin having an acid number of about 77 and a viscosity of about 1.3 Pa.s at 165° C. An epoxy resin cross-linked with a reactive acid polyester will form a blend, or hybrid, material that has flexibility and impact resistance qualities similar to those of other epoxies, but provides a higher level of ultraviolet light protection. These blends are effective when applied as an electrostatic spray and have a range of applications similar to those of thin film epoxies.

A further family of resins used for powder coating applications beneficial for their high level of exterior durability and relative ease of application are acrylic powder coatings. Acrylic resins require curing temperatures close to those of hydroxyl polyesters, and they combine high quality surface aesthetics with flexibility and impact resistance. They also exhibit excellent alkali resistance, making them well-suited for use on appliances, such as ovens and washing machines. Acrylic powder coatings can be effectively applied through electrostatic spraying and have adjustable thin film characteristics. However, acrylics are more responsive to substrate attributes than most other powder coatings, making them incompatible with certain chemical compounds. Aside from their use in appliances, acrylic powder coatings are often employed for aluminum extrusions, automotive trim components, and tractors.

Urethane powders provide both a high quality surface finish and resistance to wear. It is usually fabricated as thin film because its thick film form exhibits lower impact resistance and flexibility. A urethane coating has aesthetic qualities comparable to those of liquid paint, and it is commonly used for coating light fixtures, furniture, automotive components, wheels, and appliances.

Carboxyl polyesters have durability characteristics similar to those of epoxy-polyester blends and weathering resistance comparable to urethane. They have consistent mechanical properties across a range of standard coating thicknesses and provide a high level of flow, glossiness, and material strength. However, their resistance to chemical solvents can be lower than that of hydroxyl coatings. Carboxyl polyester powder coating is commonly used on irrigation pipes, outdoor furniture, fences, aluminium extrusions, and steel wheels.

Preferably, the subject process employs as waste powder coating compositions (hereinafter waste powders or waste powder coatings) as particulate thermoset resin binder.

Such waste powders are usually obtained during the preparation or application of powder coating compositions. Waste powders may be obtained at various stages in the preparation or application process.

An important source of waste powder is also found during preparation of the powder: the fines left after the milling and separation step, usually by cyclone extraction, cannot be used as powder coating since they, among factors, tend to block the spraying lines, which can only operate successfully with powders of a narrow particle size distribution. Suitable thermoset powder coating materials for electrostatic application usually have an average particle size (D90) of from 15 to 250 µm. Coatings of high quality of appearance are usually formed from even narrower particle size distribution, and more preferably at the lower end of the above range. Examples of an average particle size (D90) as narrow as from 15 to 50 µm are found in this area. However, coagulation and partial gelling of the particles during the process will render them unsuitable for the initial purpose.

A further source of waste powder coatings are powders resulting from overspray during application that may no longer be suitable, for instance by inclusion of dust or formation of fines due to abrasion, or coagulates; or colour change on application lines that apply multiple colours in succession.

Waste powders thus obtained usually are contaminated, and will not have the narrow particle size distribution required for the electrostatic application process. The direct recycling of waste powder is possible only subject to stringent conditions and limited to second-rate uses, such as primer coatings in two-layer systems or as coatings in applications with a lower demand on coating appearance, such as for instance scaffoldings or structures that are usually hidden from the eye of the beholder.

Although a number of processes have been devised to reprocess and recycle waste powder as feed material in the production of powder coatings, such as for instance disclosed in DE-A-4028567, these only usually allow a limited amount of the recycled powder material to be employed, since they usually involve re-extrusion and/or re-milling of collected waste powder. The thus obtained reprocessed powders are however limited in the amount of recycled powder on virgin powder, and largely dependent on the powder composition and reactivity, which may be negatively affected by crosslinking during the extrusion and/or milling steps, resulting in application and flow problems due to larger particles and gelling. Accordingly, the disclosed process does not suffice for the recycling of the whole amount of waste powder generated. Further, powders prepared partly with recycled waste tend to give more defects in the final coatings. Accordingly, it would be highly beneficial to recycle waste powder to the process according to the present invention.

Preferably, suitable fibrous materials according to the invention are the light fractions SLF (Shredder-Leichtfraktion); Rohflusen and/or Leichtflusen LF1, LF2, and/or LF1-LG disclosed in WO-A-2009/124651, and/or Shredderflusen as disclosed in DE-A-19755629. These materials are fibrous fractions obtained from recycling automobiles after removal of metals and thermoplastics. The disclosed process comprises several steps: I) A first step in the recovery cycle removal of all suitable parts that may be refurbished or recycled selectively, such as e.g. the accumulator, tyres; catalytic converters and panes of glass where applicable, and optionally, thermoplastic and/or thermoset polymeric parts; II) a step for the removal of the automotive operating fluids, such as fuel; engine, gear, power steering and shock absorber oil; air conditioning refrigerants as well as brake and coolant fluids; III) crushing the remaining bodywork and subjecting it to a grinding operation, preferably in a so-called shredder. This suitably grinds the remaining bodywork into pieces of just a few centimetres in size. At this stage, in a further step ferrous and non-ferrous metal parts are removed. In these first steps I to III, up to 80% wt. of the scrap vehicle has been removed for recycling purposes, to obtain a fraction further referred to as shredder residue, which represents 20% wt of the recycled car. This shredder residue is then subjected to a so-called the "VW-SiCon Process", wherein several fractions are gained from the shredder residue. The process thus further comprises subjecting the shredder residue is subjected to at least one further grinding step (IV), and to at least one separation step (V). The latter may advantageously be performed using one or more cyclones that separate material according to density. This process results in one or more fibrous fractions, all of which are suitable as fibrous material according to the subject process.

Preferably, the density of the fibrous material is of from 200 to 450 kg/m$^3$. The density of the fibrous material is measured prior to incorporation into the composite. Preferably, the fibrous material comprises recycled car interior material.

More preferably, the fibrous material is produced in process comprising the steps of A) shredding a car body, and B) removing ferrous and/or non-ferrous metal, and C) separating the fibrous material from a heavier fraction and a lighter particulate fraction.

Step (A) may be executed in any suitable manner. In step (B), at least a part, and preferably the majority of the ferrous and/or non-ferrous metal particles are removed. This may conveniently be done by magnetic separation for metals that respond to a magnetic field, and/or through e.g. density based separation methods, such as floating and/or centrifugation.

Preferably, the fibrous material has a carbon content of above 45% wt., and a hydrogen content of above 5% wt. The thus obtained composite materials have a density of typically in between 800 and 1600 kg/m$^3$, preferably of from 1150 to 1500 kg/m$^3$, and yet more preferably of from 1300 to 1400 kg/m$^3$, such as 1350 kg/m$^3$.

The composite material may further comprise further components, such as glass fibers, e.g. of 3 to 5 cm length. The composite material may also comprise additives, such as pigments, fillers, flow improvers, catalysts, wetting agents and other usually applied additives. These are suitably added in blending step a).

A particularly useful additive in the process and composites of the present invention is recycled ground hard polyurethane foam particles. These were found to improve the smoothness of the material and to improve the insulation properties, as well as to reduce density and weight while not affecting the mechanical strength. The first aspect was found particularly important when making panels under pressure. Without wishing to be bound to any particular theory, the polyurethane particles appear to improve the movement of fibres in the mixture, e.g. by reducing the friction between the fibres, thereby resulting a much smoother and more homogeneous composite material.

The blending step (a) may be performed by any suitable method, including mechanical methods, and/or advantageously the use of cyclone technology, which may equally allow to pre-heat binder and fibrous material, as may be required for a continuous production. In such a line-up, the two materials, together with any additive or other material as required may be advantageously be blended and premixed from e.g. two silos, and then mixed intensively while already pre-heating to allow for an improved flow if a homogenous composite with a thermoset binder is desired. Alternatively, the process may be performed batch-wise. The benefit of such a batch production is the relative ease of heating and shaping, but equally also the fact that a less homogenous material may be obtained, which can be advantageous if porous matrix materials are present as well, whereby a full saturation of cavities in the matrix may be avoided, thereby maintaining high insulation values and low density. In the process according to the invention, the blended material obtained in step (a) is preferably shaped prior to, or during the curing step, to obtain a shaped composite article.

Preferably, the process further comprises adding one or more woven or non-woven sheet material to at least one side of the composite blend prior to step (b).

This may be for simply decorative purposes, as well as UV filtration by using a pigmented or printed foil, or functional such as the use of glass or carbon fibre mats for increased strength.

Preferably the process further may comprise adding at least one porous polymeric matrix layer, preferably a rigid urethane foam layer, and applying the blended material to at least one side of the foamed polymeric matrix layer, prior to step (b). This will result in less dense composites with high insulation values.

The process according to the invention further preferably comprises heating the blended composite material such that the particulate binder material at the core of the blended material is flowing and curing.

The heating of the blended composite material may be done by any suitable heating means. According to a continuously operating embodiment of the invention, the blend of powder binder and fibrous material is pressed and heated from one or both sides, preferably pressed between a heated roll and a transportation belt, or more preferably, between heated rolls. According to another preferred embodiment, the composite to be cured is passed through a heating area, preferably through a furnace.

The composites may be formed by either a batch process or a continuous process. In a batch process, the components in the form are suitably blended together dry in the desired weight percentages. Blending may preferably occur within an extruder feed hopper or prior to the materials being introduced into the hopper via an appropriate mixing device, for example, a blender. The materials can also be fed into the hopper using vibratory feeders. The hopper then advantageously feeds the mixed material into a suitable extruder. Within the blender or extruder, the material may already be heated up, in particular in the case of thermoplastic binders, such that the binder enters a molten state. In the case of thermosetting binders, The blended material is then preferably discharged into a mold.

The composite material further preferably comprises a porous polymeric matrix layer, for increased thermal insulation. Preferably, when shaped into panels, the edges of the composite panel comprise a higher amount of the composite material to increase mechanic strength. The process may be advantageously be performed in a heated press.

The composite material preferably further comprises at least one woven or non-woven sheet layer, to improve the mechanical properties such as tensile strength and surface resilience. The composite material may further comprise a cover sheet material to create an exterior expression, such as coloured films, preferably also comprising a UV filter, printed films, printed paper or carton box, woven or non-woven fabrics.

According to a further preferred embodiment of the invention, the powder is heated by radiation, such as microwaves to ensure that the core of the composite material also is heated. Alternatively, and most easily, the process may be performed in a batch-wise operation, wherein the mold with the composite material is heated, advantageously in an oven. Preheating of the binder material or the blended material prior to introduction into the mold may also be performed, provided that in case of a thermoset binder, the heat supply should be limited to not allow the material to cure completely. This allows adapting the curing cycle to the particulate binder material in the case of thermoplastic binders.

The heat supply may be removed, and the mold may be cooled once the composite has been formed in the case of thermoplastic binders. In the case of the thermoset binders the cure cycle requires that the particulate binders first melts and flows, while at the same time the curing begins.

Preferably, the increased temperature refers to a temperature in the range of from 190 to 350° C., preferably 120 to 280° C., yet more preferably 140 to 250° C. The pressure may be any pressure that is suitably applied, and may range from ambient pressure or slightly above that, such as the pressure exerted by a vacuum bag, to a pressure of several tons per square meter, as suitably applied by e.g. a hydraulic press. Preferably the pressure ranges of from 0.1 MPa to 10 MPa, preferably from 1 to 7 Mpa, again more preferably from 2 to 6.5 Mpa. The unit pressure applied to the molding material in a mold. The area is calculated from the projected area taken at right angles to the direction of applied force and includes all areas under pressure during the complete closing of the mold. The unit pressure, expressed in kg per square centimetre, is calculated by dividing the total force applied by this projected area. This is particularly suitable as a high-volume, high-pressure method suitable for a semi-continuous or continuous mode of operation. The time required to achieve a suitable strength and appearance depends largely on the kind of particulate binder used, but may range from several seconds, e.g. at high pressure and temperature, to several hours. Preferably, the time wherein the increased temperature and pressure are applied ranges of from 1 s to 10 hours, more preferably from 5 s to 5 h, yet more preferably from 30 s to 3 h, again more preferably from 1 min to 1 h. Furthermore, the material may be pre-heated, and/or postcured as required.

The process of the invention is applicable to any kind of powder coating composition. As far as mixtures of two or more compositions are concerned, their compatibility should be evaluated first.

The present invention further relates to the use of the optionally shaped composite article as building or sheet material, as decorative and/or functional panelling, e.g. as noise suppression walls, or as a basis for flooring, e.g. as panels for laminate floors.

The present invention also relates to the composite material comprising a fibrous material and a binder, wherein the fibrous material has a density of from 150 to 500 g/m³ prior to incorporation into the composite material, and wherein the binder material is a particulate binder having an average particle size (D90) of from 15 to 50 μm prior to incorporation into the composite, as obtainable by the subject process. The composite material preferably has a flame spread index of B-S3 or better according to EN 13501-1:2007.

The composite material is resistant to attack by microbes and insects and thus does not require expensive chemical treatments. Also, the material is resistant to degradation from exposure to ultraviolet light as well as damp, freezing conditions.

The present invention further preferably relates to a shaped article comprising the composite material according to the invention, such as advantageously in the form of a flat, square-shaped panel module for use in assembling building structures. Such panels may also advantageously be employed as replacement for fibre enforced concrete panels in structural or other outdoor applications, such as sound proofing, as at the side of highly frequented roads The following examples are provided to exemplify the invention.

EXAMPLE 1

As a particulate binder material, waste epoxy powder coating material was employed.
The binder material was intimately blended by hand with fibrous material obtained from Auto Recycling Nederland, in a weight ratio of 1:1. The fibrous material was obtained according to a process as disclosed in WO-A-2009/124651, specifically fraction LF1, i.e. the light fraction after removal of metals and thermoplastics. The fibrous material had the following properties (table 1):

TABLE 1

Compositional data of the fibrous material (AAS)

| Unit | Component | |
|---|---|---|
| Ppm | Aluminium | 14,637 |
| Ppm | Antimony | 301 |
| Ppm | Arsenic | 10 |
| Ppm | Barium | 1,249 |
| Ppm | Beryllium | 0.1 |
| Ppm | Bismuth | 5.2 |
| Ppm | Boron | 90 |
| Ppm | Cadmium | 16 |
| Ppm | Calcium | 13,700 |
| Ppm | Chromium | 187 |
| Ppm | Cobalt | 17 |
| Ppm | Copper | 9,189 |
| Ppm | Gallium | 2 |
| Ppm | Iron | 27,400 |
| Ppm | Kalium | n.d. |
| Ppm | Lanthanum | 6 |
| Ppm | Lead | 2,572 |
| Ppm | Lithium | 12 |
| Ppm | Magnesium | 2,157 |
| Ppm | Manganese | 524 |
| Ppm | Mercury | 0.8 |
| Ppm | Molybdenum | 25 |
| Ppm | Natrium | n.d. |
| Ppm | Nickel | 151 |
| Ppm | Niobium | 3 |
| Ppm | Potassium | 733 |
| Ppm | Rubidium | 4.9 |
| Ppm | Scandium | 0.8 |
| Ppm | Selenium | 0.3 |
| Ppm | Sodium | 1,641 |
| Ppm | Strontium | 89 |
| Ppm | Silver | 9 |
| Ppm | Silicon | 14,050 |
| Ppm | Thallium | 0 |
| Ppm | Thorium | 1 |
| Ppm | Tin | 151 |
| Ppm | Titanium | 914 |
| Ppm | Tellur | n.d. |
| Ppm | Tungsten | 11 |
| Ppm | Uranium | 0 |
| Ppm | Vanadium | 16 |
| Ppm | Yttrium | 2 |
| Ppm | Zinc | 5,634 |
| Ppm | Zirconium | 42 |
| Weight % ds | Bromine | 0.03 |
| Weight % ds | Fluorine | 0.01 |
| weight % ds | Chlorine | 1.61 |
| weight % ds | Sulphur | 0.23 |

TABLE 2

Physical measurements

| Unit | Property | |
|---|---|---|
| kg/m³ | Density | 390 |
| % | LOI (Loss on Ignition) | 80 |
| % | Ignition residue (ash content) | 19 |
| ° C. | Temperature during LOI measurements | 667 |
| MJ/kg | Calorific value | 22 |
| % | Moisture content (105° C.) | 3.59 |
| % | Dry residue (105° C.) | 96 |
| % | C | 53 |
| % | H | 5.81 |
| % | N | 3.23 |
| % | S | n.d. |
| % | O (calculated) | 28 |

All ratios or measures herein, if not otherwise indicated, are by weight. A simple metal mold comprising two metal plates was employed.

The metal plates were covered with siliconized paper, then a woven glass fibre mat was placed onto the mold, then the blended composite material, and finally a glass fibre mat. The mold was placed in a vacuum bag.

Subsequently, the thus layered material was pressed between two metal plates by applying vacuum to a layer thickness of about 3 cm, at a pressure equivalent to 4.5 kg/cm². Then the assembly was heated to a first temperature of 120° C. for a period of 30 minutes, then heated to a temperature of 180° C. for a period of 180 minutes.

After allowing the plates to cool, the thus obtained composite panel was subjected to a number of tests, including a flame propagation test according to NEN 6065 and a humidity test by submersing the plates in boiling water and measuring the weight gain.

The plates had sufficient mechanical properties and showed no significant weight gain upon immersion for several hours.

EXAMPLE 2

Fire Retardancy

This test is performed according to EN-13501-1:2007, a standard test method for flame propagation in building materials. This test serves to determine the relative surface flammability and smoke performance of various materials under specific test conditions as well as the some development. The test results showed that the composite panel prepared according to example 1 obtained a B-S3 classification.

EXAMPLE 3

Panels with a Less Dense Fibrous Material

Example 1 was repeated, however employing a less dense fibrous material of the same composition. This fibrous material was prepared using the same process as the first fibrous material, however had been milled twice, thus reducing fibre length and resulting in a more filt-like consistency. The panel thus obtained had a smoother surface than the panel obtained in example 1, however otherwise had similar properties.

EXAMPLE 4

Panels with a Foam Core

Example 1 was repeated, however adding a foam core from rigid polyurethane foam, and using a different mold with structural side formation to allow the panel to be fixed to a further panel with a click system. The panel thus obtained was suitable as a building material, having a suitably high insulation effect, while providing composite side structures of high strength that allow easy combination with other like-wise shaped panels.

EXAMPLE 5

Variation of Ratios Binder/Fibrous Material

Example 1 was repeated, varying the ratio of particulate binder on fibrous material from 2:1 to 1:4 by weight. All panels obtained were found to have a suitable appearance and sufficient strength, although density and mechanical properties increased with increased binder.

The examples above clearly show the advantages of the process and materials of the present invention. Although several specific embodiments of the present invention have been described in the detailed description above, this description is not intended to limit the invention to the particular form or embodiments disclosed herein since they are to be recognised as illustrative rather than restrictive, and it will be obvious to those skilled in the art that the invention is not limited to the examples.

The invention claimed is:

1. A process for the preparation of a composite material from a particulate binder material having an average particle size (D90) of from 15 to 850 μm and a fibrous material having a density of from 150 to 550 kg/m², comprising the steps of:
    a) blending the particulate binder material and the fibrous material in a weight ratio of 60:40 to 10:90, and
    b) subjecting the blended material obtained in a) to a curing step under increased temperature and pressure to obtain a composite material,
    wherein the fibrous material is obtained by a method comprising:
    A) shredding a car body,
    B) removing at least art of ferrous and/or non-ferrous metal, and
    C) separating the fibrous material from a heavier fraction and a lighter particulate fraction.

2. The process according to claim 1, wherein the density of the fibrous material is in the range of from 200 to 450 kg/m².

3. The process according to claim 1, wherein the fibrous material has a carbon content of above 45% wt, and a hydrogen content of above 5% wt.

4. The process according to claim 1, wherein the particulate binder material comprises a thermoset polymeric material.

5. The process according to claim 1, wherein the particulate binder material comprises waste powder coating material obtained from overspray and/or powder coating production.

6. The process according to claim 4, wherein the particulate thermoset material comprises a powder coating material that is collected as overspray from at least one powder coating application.

7. The process according to claim 1, further comprising shaping the blended material obtained in step (a) prior to or during the curing step, to obtain a shaped composite article.

8. The process according to claim 1, further comprising adding a woven or non-woven sheet material to at least one side of the composite blend prior to step (b).

9. The process according to claim 1, further comprising adding a particulate polyisocyanurate and/or polyurethane foam to the particulate binder material and the fibrous material.

10. The process according to claim 1, further comprising providing at least one porous polymeric matrix layer, and applying the blended material to at least one side of the porous polymeric matrix layer, prior to step (b).

11. The process according to claim 1, wherein the blended material has outward facing sides and a core and wherein the process further comprises heating the blended composite material such that the particulate binder material at the core of the blended material is flowing and curing.

12. A shaped composite article produced by the process of claim 1 which is useful as a building or sheet material.

13. A composite material comprising a binder and a fibrous material in a weight ratio of from 60:40 to 10:90, wherein the fibrous material has a density of from 150 to 500 g/m² prior to incorporation into the composite material, wherein the binder material is a particulate binder having an average particle size (D90) of from 15 to 850 μm prior to incorporation into the composite, and wherein the composite material further comprises a porous polymeric matrix layer.

14. The composite material according to claim 13, having a flame spread index of B-S3 or better according to EN 13501-1:2007.

15. The composite material according to claim 13, wherein the fibrous material comprises recycled car interior material.

16. The composite material according to claim 13, wherein the binder is a thermoset binder.

17. The composite material according to claim 16, wherein the binder comprises waste powder coating material.

18. The composite material according to claim 13, farther comprising a particulate polyisocyanurate and/or polyurethane foam blended with the particulate binder material and the fibrous material.

19. The composite material according to claim 18, wherein the particulate polyurethane foam has a closed cell content of at or above 90%, as determined according to ASTM D 2856, Procedure A.

20. The composite material according to claim 18, wherein the density of the particulate foam material is higher than 33 kg/m$^2$, as determined according to ASTM D1622.

21. The composite material according to claim 13, further comprising at least one woven or non-woven sheet layer.

22. A shaped article comprising the composite material according to claim 13.

23. The shaped article according to claim 22, wherein the shaped article is a flat, square-shaped panel module for assembling a building structure.

24. The shaped article according to claim 23, wherein the flat, square-shaped panel module is useful for panelling.

* * * * *